(12) United States Patent
Malherbe de Juvigny et al.

(10) Patent No.: US 6,592,706 B1
(45) Date of Patent: Jul. 15, 2003

(54) METHOD OF MANUFACTURING A TRANSPARENT OBJECT AND AN OBJECT OBTAINED WITH METHOD

(75) Inventors: René Cornelis Malherbe de Juvigny, Leuten (NL); Johannes Maria Zandvliet, Wassenaar (NL)

(73) Assignee: Marbleous World B.V. (NL)

( * ) Notice: Subject to any disclaimer, the term of this patent is extended or adjusted under 35 U.S.C. 154(b) by 0 days.

(21) Appl. No.: 09/202,757

(22) PCT Filed: Jun. 20, 1997

(86) PCT No.: PCT/NL97/00348

§ 371 (c)(1),
(2), (4) Date: Aug. 2, 1999

(87) PCT Pub. No.: WO97/48565

PCT Pub. Date: Dec. 24, 1997

(30) Foreign Application Priority Data

Jun. 21, 1996 (NL) .............................................. 1003388

(51) Int. Cl.[7] .............................................. B32B 31/00
(52) U.S. Cl. .............................. 156/292; 428/7; 428/11; 472/57; 472/67; 472/68
(58) Field of Search .................................. 156/145, 146, 156/292, 63; 428/7, 13, 14, 542.2, 542.4, 11; 472/57, 67, 68; 362/809; D11/121; 40/406, 409

(56) References Cited

U.S. PATENT DOCUMENTS

| 2,917,856 | A | * | 12/1959 | Soloff ........................... 428/13 |
| 3,132,695 | A | * | 5/1964 | Peltier .......................... 169/26 |
| 3,440,128 | A | * | 4/1969 | Kubilius ........................ 161/5 |
| 3,802,104 | A | * | 4/1974 | Wiley ........................... 40/152 |
| 4,119,153 | A | * | 10/1978 | Avant ........................... 169/75 |
| 4,173,667 | A | * | 11/1979 | Rusch ........................... 428/11 |
| 4,182,737 | A | * | 1/1980 | Haber et al. ................... 264/132 |
| 4,584,212 | A |   | 4/1986 | Klein et al. .................... 428/13 |
| 4,642,251 | A | * | 2/1987 | Quinn ........................... 428/7 |
| 4,643,693 | A | * | 2/1987 | Rubinstein ..................... 446/267 |
| 5,227,205 | A | * | 7/1993 | Dubrow et al. ................. 428/13 |
| 5,414,968 | A |   | 5/1995 | Willner ......................... 52/306 |
| 5,603,176 | A | * | 2/1997 | Eddins et al. .................. 40/406 |
| 6,438,878 | B1 | * | 8/2002 | Fine et al. ..................... 40/409 |
| 6,475,609 | B1 | * | 11/2002 | Whitney et al. ............... 428/212 |

FOREIGN PATENT DOCUMENTS

| DE | 4000006 A1 | 7/1991 | ............. E04C/1/42 |
| FR | 1138950 | * 6/1957 | |

OTHER PUBLICATIONS

Database WPI, Week 8247, Accession No. 82–00831J, Abstract of JP 57167213, Oct. 15, 1982, 1 page.

* cited by examiner

Primary Examiner—Michael W. Ball
Assistant Examiner—Jessica Rossi
(74) Attorney, Agent, or Firm—Webb Ziesenheim Logsdon Orkin & Hanson, P.C.

(57) ABSTRACT

Disclosed is a method by which a transparent object can be manufactured, in which transparent object an inclusion is arranged. A spherical object can be a substantially two-dimensional or three-dimensional object. The method includes the following steps, to be performed in suitable sequence, of: a) providing two complementary halves of the object such that at least one of two contact surfaces of the respective halves to be directed toward each other has a central recess which also forms a boundary of a cavity for accommodating at least a part of the inclusion; b) arranging at least said part of the inclusion in said recess; and c) mutually adhering the two halves, for instance by means of the parts of the two contact surfaces extending around the central recess, in order to form the object.

21 Claims, 5 Drawing Sheets

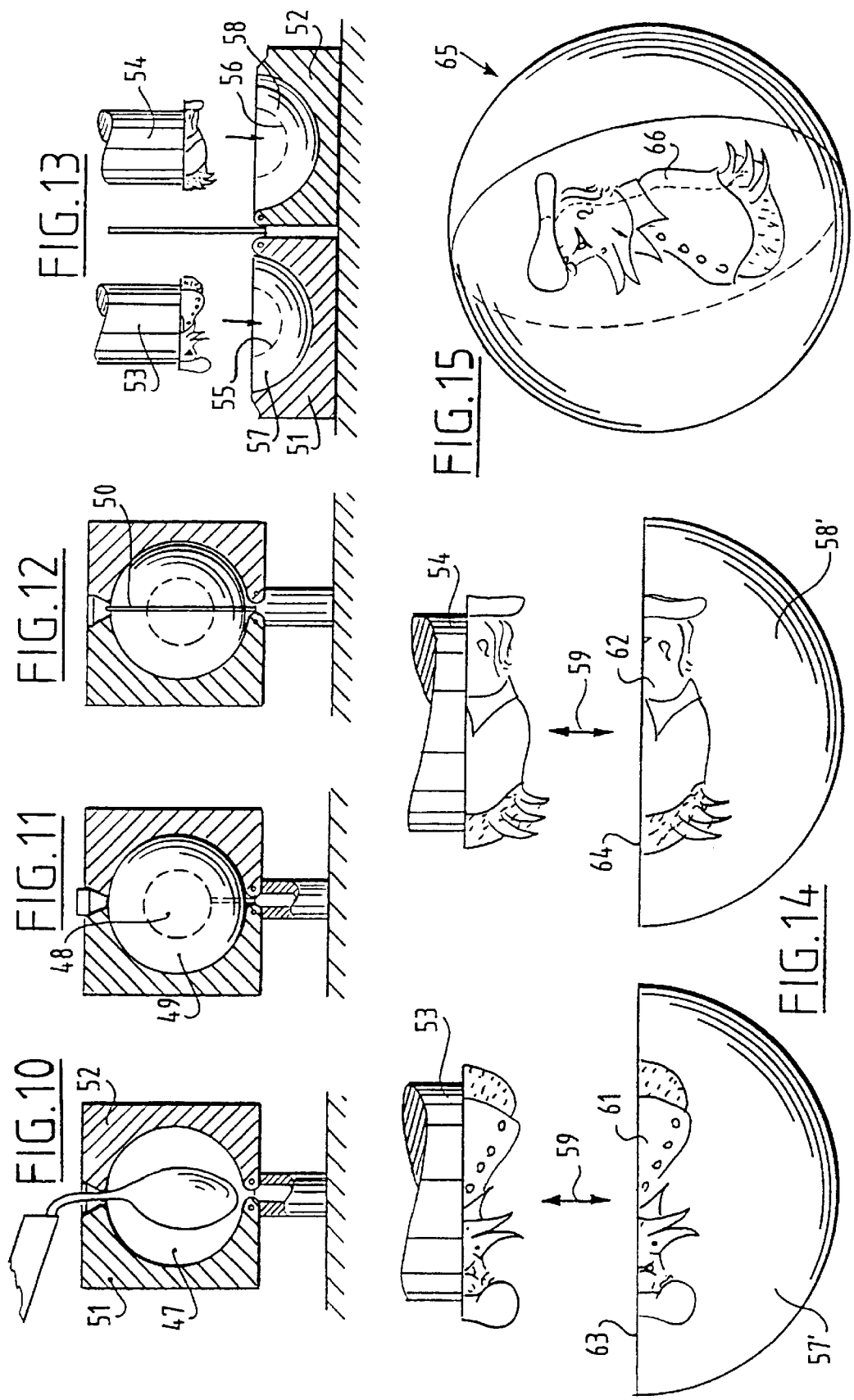

METHOD OF MANUFACTURING A TRANSPARENT OBJECT AND AN OBJECT OBTAINED WITH METHOD

BACKGROUND OF THE INVENTION

1. Field of the Invention

This invention relates to transparent objects having an inclusion arranged therein.

2. Description of the Prior Art

From FR-A-1 138 950 a method for manufacturing a transparent object is known. According to this prior art method two complementary halves of an object are provided such that either contact surface of the respective halves to be directed to each other is provided with a central recess, the complete recess in the final composition forming the boundary of a cavity having a specific shape corresponding to a three-dimensional object. It is noted that according to this prior art reference such an object defined by the central recesses has a "virtual" nature, since only the boundaries of the object are present and the cavity bounded by the recesses has a shape corresponding to the shape of a simulated object or inclusion.

From U.S. Pat. No. 4,642,251 a method for manufacturing a transparent object is known, said object being composed of two transparent halves in their assembled state bounding together a cavity in which a honey liquid is enclosed.

Both prior art references have in common that the final transparent objects are bounded by flat surfaces, whereas the method according to the present invention is also directed to manufacturing a transparent sphere. Furthermore, none of the prior art references discloses the use of a two-dimensional or three-dimensional inclusion which is embedded in the cavity formed by the recess or the recesses in a transparent mass encapsulating the inclusion.

SUMMARY OF THE INVENTION

An object of the present invention is to provide a method for manufacturing a transparent object in which an inclusion is arranged. A spherical object can for instance be envisaged in which a substantially two-dimensional or three-dimensional object is accommodated.

The stated objective is generally realized according to the invention by a method for manufacturing a transparent object, for instance a sphere, with a substantially two-dimensional or three-dimensional inclusion, which method comprises the following steps, to be performed in suitable sequence, of:

(a) providing two complementary halves of the object such that at least one of the two contact surfaces of the respective halves to be directed toward each other has a central recess which also forms the boundary of a cavity for accommodating at least a part of the inclusion;

(b) arranging at least said part of the inclusion in said recess; and (c) mutually adhering the two halves, for instance by means of the parts of the two contact surfaces extending round the central recess, in order to form the object;

wherein the cavity formed by the recess(es) is filled with a transparent mass encapsulating an introduced inclusion, for instance a liquid or a glue which is transparent after curing, wherein the inclusion is accommodated in the cavity.

Claim 2 is a further development. In this embodiment the transition surface between the object and the mass can be seen only with difficulty or not at all.

The invention, also relates to a transparent as specified in the claims 1–18.

The steps according to claims 17 and 18 offer the possibility of controlling within determined limits the magnification resulting from the optical effect of a half and of making this magnification dependent on the side from which a user views an inclusion. The method according to the invention offers the possibility of manufacturing an object, wherein an introduced object is embedded as an inclusion, as if it were "floating" in a transparent mass.

BRIEF DESCRIPTION OF THE DRAWINGS

The invention will now be elucidated with reference to the annexed drawings. Herein:

FIGS. 10–15 show very schematically a possible manufacture of a glass object with a three-dimensional inclusion.

DESCRIPTION OF THE PREFERRED EMBODIMENTS

Figure 1:
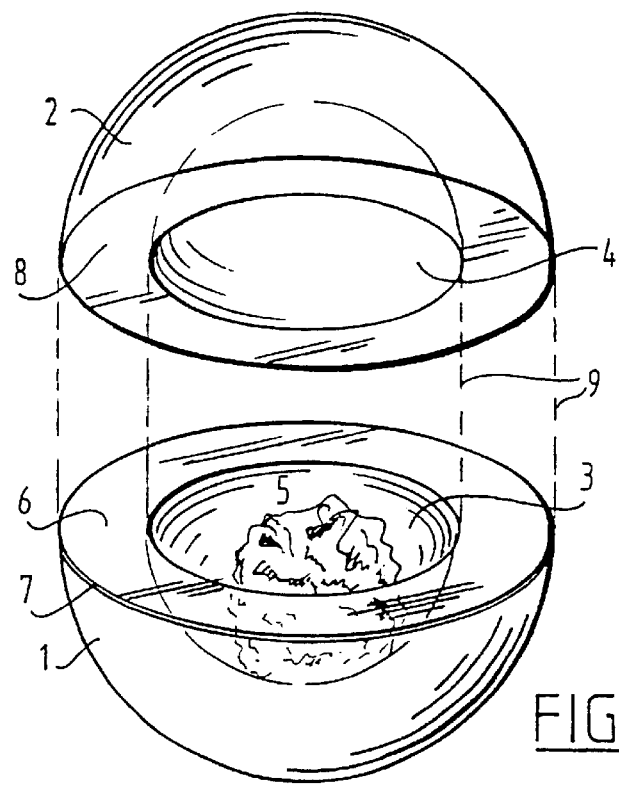
FIG. 1 shows a perspective view of two halves which can be assembled to form an object.

FIG. 1 shows a lower half 1 and an upper half 2, each having the shape of a hollow hemisphere. Each half has a hemispherical recess respectively 3, 4 and a three-dimensional inclusion 5 is positioned in the lower recess 3. This can be held in place by suitable means to be described hereinbelow, for instance by adhesion to the bottom of recess 3. The annular flat peripheral surface 6 of recess 3 has an adhesive layer 7 which can adhere to the annular peripheral surface 8 of recess 4. The adhesive layer 7 can for instance comprise a pressure-sensitive or thermally-activated glue or be embodied as a layer of adhesive enamel or double-sided adhesive tape. By placing the halves 1, 2 onto one another as according to the broken lines 9 an object can be obtained in which the inclusion 5 is accommodated.

The halves 1, 2 can be manufactured from any suitable transparent material, for instance glass or transparent plastic.

In the embodiment shown in FIG. 1 the outer surfaces of halves 1, 2 are hemispherical. The obtained object is wholly spherical.

Figure 2:
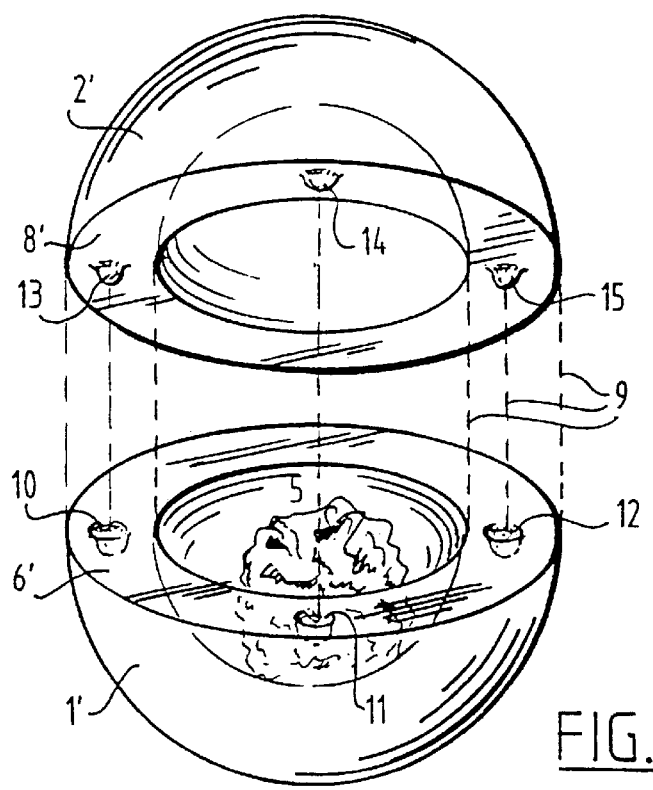
FIG. 2 shows a view corresponding with FIG. 1 of a variant.

FIG. 2 shows a variant in which the halves 1', 2' can be placed onto one another in only one position. For this purpose the surface 6' is provided with three shallow recesses 10, 11, 12, while surface 8' is provided with three corresponding protrusions 13, 14, 15 respectively. It will be apparent that due to the asymmetrical placing of the respective recesses and protrusions only one positioning is possible, wherein the remaining portions of surfaces 6' and 8' are laid flat onto one another for mutual adhesion in the manner described with reference to FIG. 1.

Figure 3:
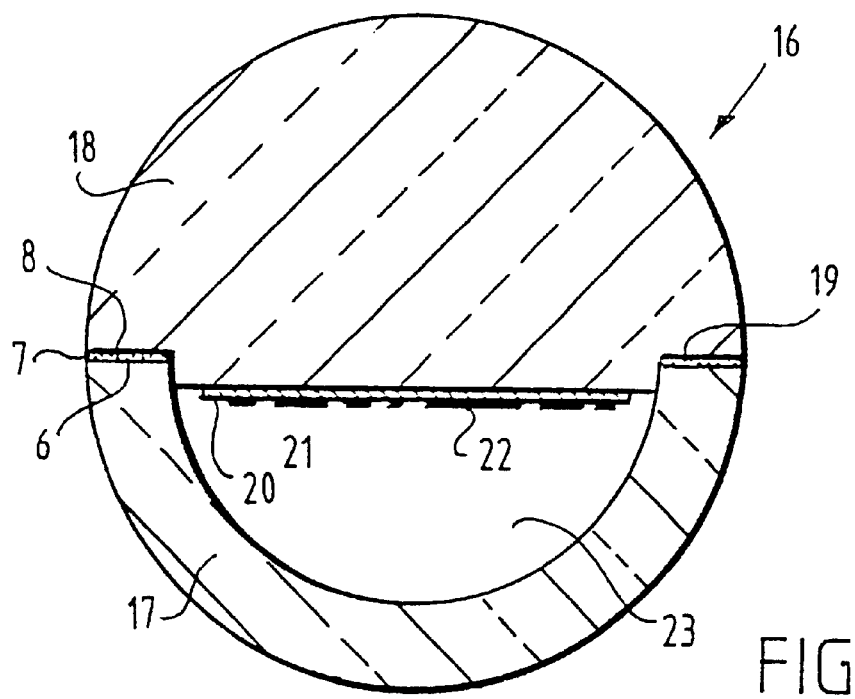
FIG. 3 shows a cross section through another embodiment.

FIG. 3 shows an object 16 comprising a substantially hemispherical lower half 17 and a complementary hemispherical upper half 18. The upper half 18 is solid while the lower half 17 is hollow. A good mutual positioning of the halves 17, 18 is ensured by the recessed edge zone 19 into which the half 17 fits exactly. An adhesive foil 21 with printing 22 is adhered to the flat inner surface 20 of the half 18. The foil 21 is transparent so that the printing 22 is visible from both the underside (as according to FIG. 3) and from above. Due to the solid embodiment of upper half 18 the printing 22 will be seen from above at a considerably greater magnification than from the underside.

Figure 4:
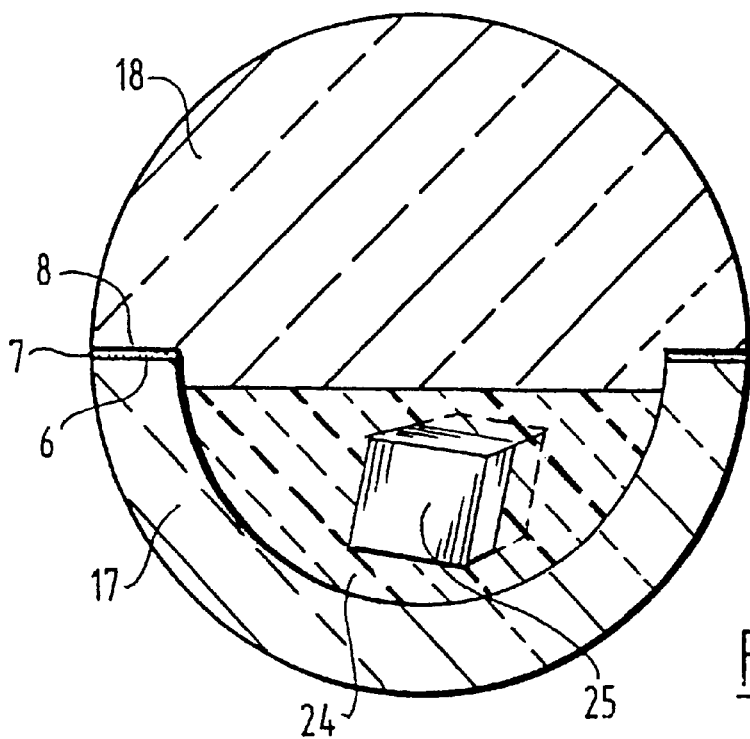
FIG. 4 shows a view corresponding with FIG. 3 of a variant.

FIG. 4 shows a variant wherein the halves 17, 18 correspond with those according to FIG. 3. In this embodiment however, the cavity 23, which has a roughly hemispherical form, is wholly filled with a transparent filling mass 24 in which is embedded an inclusion 25. This is a three-dimensional object, in contrast to the foil 21 of FIG. 3 which can be deemed essentially two-dimensional.

Figure 5:
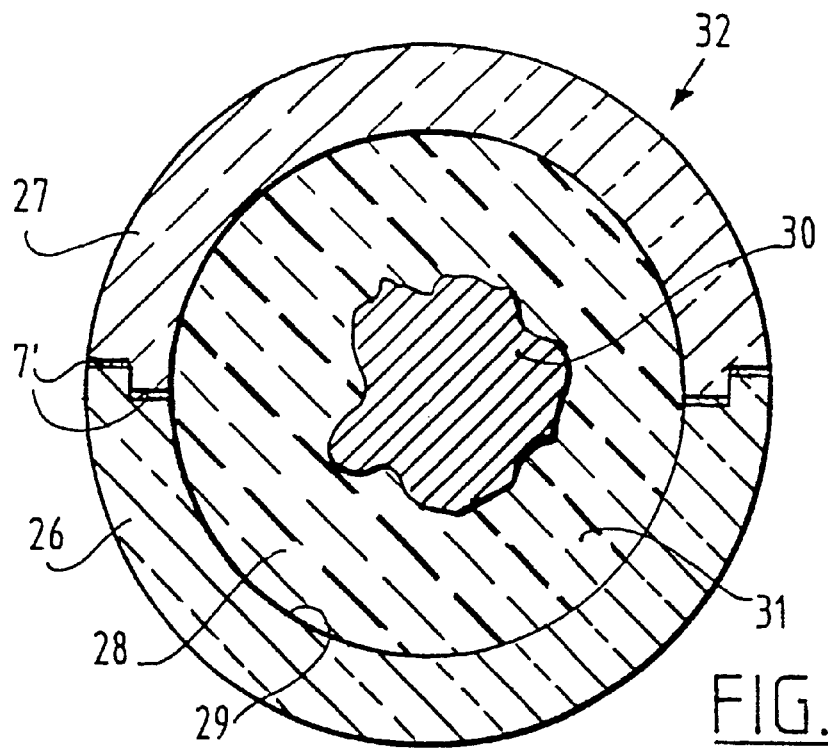
FIG. 5 shows a cross section through yet another embodiment.

FIG. 5 shows a variant with two hollow halves 26, 27. These are mutually connected by step-like peripheral surfaces by means of adhesive layers 7'. The internal cavity 28 is filled with a liquid, the refractive index of which roughly corresponds with that of the material of the halves 26, 27, for instance glass. The boundary surface 29 is hardly or not at all visible as a result. The three-dimensional inclusion 30 which is wholly enclosed by the liquid 31 in cavity 28 therefore appears optically to a user of object 32 to be assimilated in the liquid, while the user feels that the object 32 is solid. This is a very surprising effect.

Figure 6:
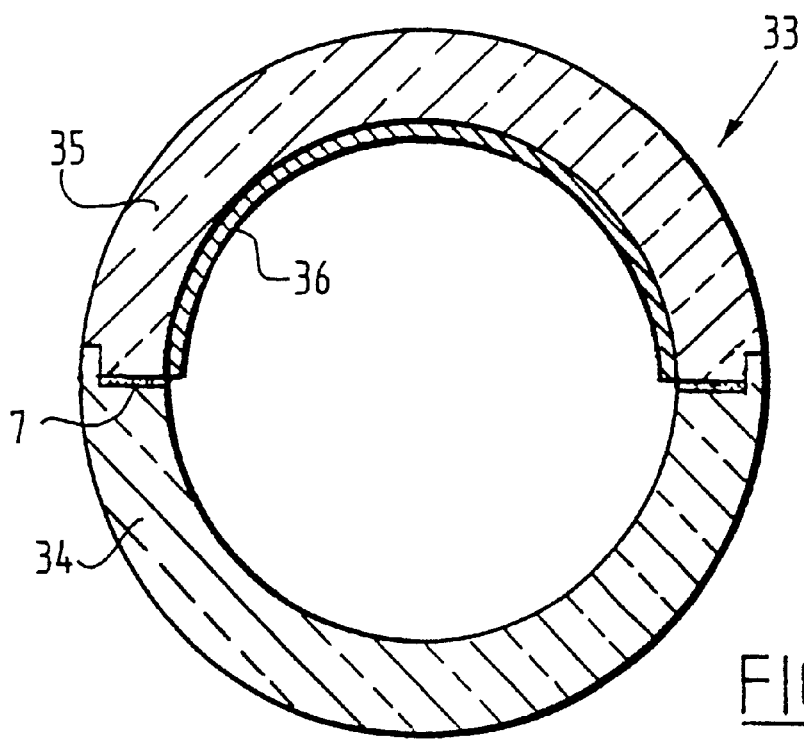
FIG. 6 shows a cross section corresponding with FIG. 5 through a further variant.

FIG. 6 shows an object 33 which consists of two halves 34, 35 which are mutually connected in the same manner as shown in FIG. 5. The inner surface of the upper half 35 is provided with a reflective coating 36. This can very suitably consist of vapour-deposited aluminium.

Very surprising optical effects can be achieved with the object 33.

It is noted that a combination of the aspects of FIGS. 5 and 6 can also be applied. Attractive and even spectacular effects can herein be realized with varying magnifications.

Figure 7:
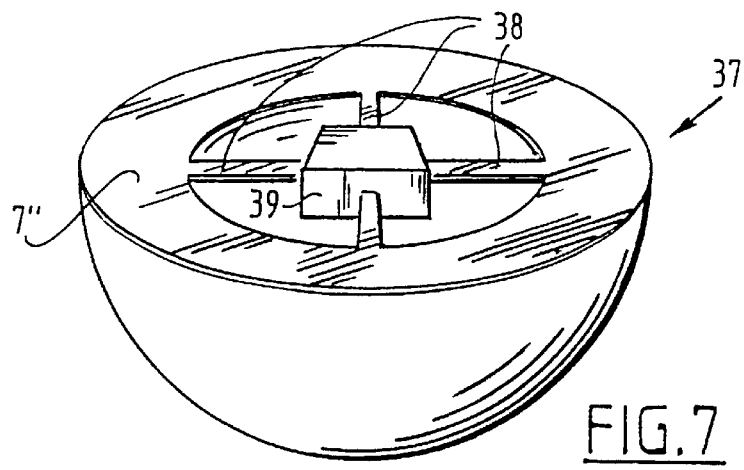
FIG. 7 is a perspective view of a half in another embodiment.

FIG. 7 shows a half 37 wherein the adhesive layer 7" consists of adhesive enamel which can be thermally activated for adhesion to an upper half (not drawn). The adhesive enamel comprises four bridges 38 which support in the cavity 33 a three-dimensional object 39 for inclusion.

Figure 8:
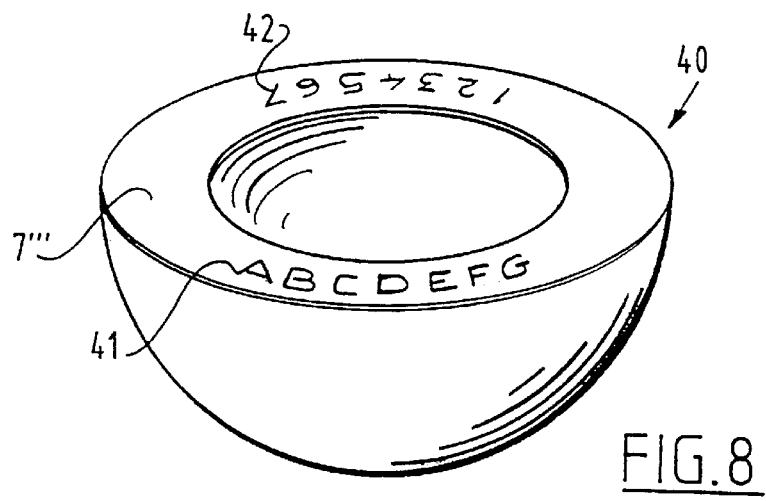
FIG. 8 is a perspective view corresponding with FIG. 7 of yet another embodiment.

FIG. 8 shows a half 40, wherein the adhesive enamel 7''' is transparent and carries information 41, 42.

Attention is once again drawn to the fact that the combination of different described and drawn aspects is possible.

Figure 9:
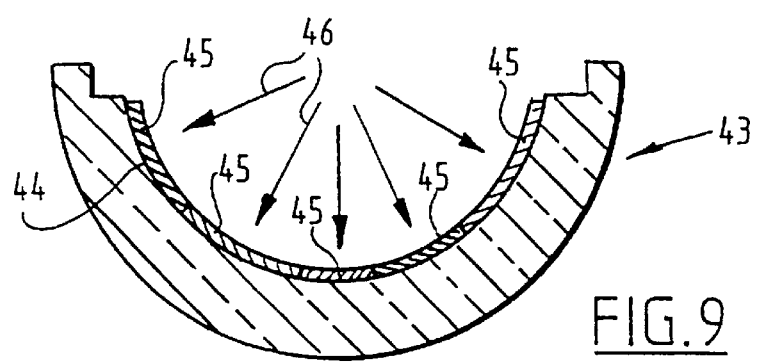
FIG. 9 shows a cross section through a half in yet another embodiment.

FIG. 9 shows a half 43 corresponding with the half 34 of FIG. 6, wherein the concave inner surface 44 is provided with printings which for the sake of convenience are all designated 45. Using the stipple method these printings are applied in respective colours and can consist for instance of low-melting types of enamel. Arrows 46 indicate symbolically the application of the printings 45 with the stipple method. The printings can be adhered and cured by a thermal treatment.

FIGS. 10, 11 and 12 show schematically respectively the filling of a mould cavity 47 with liquid glass, the forming of a cavity 48 in the thus formed glass sphere 49 and the separating of the hollow sphere 49 into two parts via plane 50. This division according to FIG. 12 takes place at a temperature at which the glass is still plastic. The mould halves 51, 52 are then set down as according to FIG. 14 such that stamps 53, 54 (see also FIG. 14) can form an impression in the bottoms 55, 56 of the halves 57, 58.

As shown in FIG. 14, a three-dimensional impression of the stamps 53, 54 is realized in the halves 57', 58'. It will be apparent that in the direction of displacement 59 of stamps 53, 54 the active stamping surfaces may not have undercut forms.

The impressions 61, 62 in halves 57', 58' are complementary. The flat end surfaces 63, 64 can be mutually adhered, for instance with a transparent glue, while making use of a positioning, an example of which is shown in FIG. 2. An object 65 can therewith be obtained in which a complete three-dimensional FIG. 66 is accommodated as boundary of a cavity corresponding with both impressions 61, 62. Making use of for instance stipple printing as according to FIG. 9 the impressions 61, 62 can be provided with selectively coloured patterns.

The mutual adhesion of two halves can in general advantageously take place with a transparent glue. This provides an optically more attractive product.

In addition to stipple print with low-melting enamel use can also be made of other printing techniques, inter alia screen print for instance.

Further shown in the drawings are only flat and concave inner surfaces of the inner cavity of the objects. Other forms are however also possible.

In a case as in FIG. 4, the mass 24 could also have an adhesive function. In that case it can also serve to mutually adhere the halves 17 and 18 so that the adhesive layer 7 can be omitted.

What is claimed is:

1. A method for manufacturing a transparent spherical object with a substantially two-dimensional or three-dimensional inclusion, which method comprises the following steps:

(a) providing two complementary halves of the spherical object such that at least one of two contact surfaces of the respective halves to be directed toward each other has a central recess which also forms a boundary of a cavity for accommodating at least a part of the inclusion;

(b) arranging at least said part of the inclusion in said recess(es); and (c) mutually adhering the two halves in order to form the object:

wherein the cavity formed by the recess(es) is filled with a transparent mass, which is transparent and rigid after curing, encapsulating the inclusion.

2. The method as claimed in claim 1, wherein the mass has a refractive index in the same order of magnitude as that of the material of the two halves.

3. The method as claimed in claim 1, wherein at least one of the recesses is provided with a reflective coating.

4. The method as claimed in claim 1, wherein the halves are manufactured from glass.

5. The method as claimed in claim 1, wherein the halves are manufactured from a transparent plastic.

6. The method as claimed in claim 1, wherein the inclusion comprises a three-dimensional pattern which is formed by impressing with a stamp in the bottom of the recess at a temperature at which the material of the half having the recess therein is plastic.

7. The method as claimed in claim 1, wherein step (c) is performed with a material selected from the group consisting of a glue, an adhesive enamel and a double-sided adhesive foil.

8. The method as claimed in claim 7, wherein the glue or the adhesive enamel is transparent.

9. The method as claimed in claim 7, wherein the adhesive enamel is provided in advance with information.

10. The method as claimed in claim 7, wherein use is made of transparent, optical glue.

11. The method as claimed in claim 1, wherein the two halves mutually engage with edge zones which do not extend in a flat main plane of the contact surfaces, such that the halves are not relatively slidable in that main plane.

12. The method as claimed in claim 1, wherein each of the two halves has a central recess, which two recesses each support a part of the inclusion, wherein the peripherally extending contact surfaces are formed such that prior to step (c) they can only be placed onto one another in one relative orientation.

13. The method as claimed in claim 1, wherein the recess has, a flat bottom.

14. The method as claimed in claim 1, wherein the recess has a concave bottom.

15. The method as claimed in claim 1, wherein the two halves are mutually adhered by means of the parts of the two contact surfaces extending around the central recess(es).

16. The method as claimed in claim 1, wherein the transparent mass is glue.

17. The method as claimed in claim 1, wherein the inclusion is three-dimensional, is accommodated in said recess and is manufactured substantially from a crystalline sugar.

18. The method as claimed in claim 17, wherein the inclusion is at least partially provided with a coloured coating.

19. The method as claimed in claim 1, wherein the inclusion comprises a printing.

20. The method as claimed in claim 19, wherein the printing is applied by the stipple method or by screenprinting.

21. A transparent object obtained with the method as claimed in claim 1.

* * * * *